United States Patent
Sarode et al.

(10) Patent No.: US 11,956,005 B2
(45) Date of Patent: Apr. 9, 2024

(54) APPARATUS SUPPORTING MULTI-RADIO COEXISTENCE

(71) Applicant: Qorvo US, Inc., Greensboro, NC (US)

(72) Inventors: Mayur Sarode, Hilversum (NL); Marcel Vrijkorte, Geffen (NL)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 17/717,575

(22) Filed: Apr. 11, 2022

(65) Prior Publication Data

US 2022/0239327 A1    Jul. 28, 2022

Related U.S. Application Data

(63) Continuation of application No. 16/239,916, filed on Jan. 4, 2019, now abandoned.

(51) Int. Cl.
*H04B 1/401*         (2015.01)
*H04B 1/00*          (2006.01)
(Continued)

(52) U.S. Cl.
CPC .......... *H04B 1/401* (2013.01); *H04B 1/0064* (2013.01); *H04B 1/0067* (2013.01); *H04B 1/18* (2013.01);
(Continued)

(58) Field of Classification Search
CPC ........ H04B 1/401; H04B 1/18; H04B 1/0064; H04B 1/0067
See application file for complete search history.

(56) References Cited

U.S. PATENT DOCUMENTS 6,505,253 B1 * 1/2003 Chiu ............... H04L 1/1832 370/254
8,335,206 B1 * 12/2012 Hirsch ............ H04W 72/1215 370/349

(Continued)

OTHER PUBLICATIONS

Author Unknown, "IEEE 100 The Authoritative Dictionary of IEEE Standards Terms," 7th Edition, Dec. 2000, Standards Information Network IEEE Press, 3 pages.

(Continued)

*Primary Examiner* — Gennadiy Tsvey
(74) *Attorney, Agent, or Firm* — Withrow & Terranova, P.L.L.C.

(57) ABSTRACT

An apparatus supporting multi-radio coexistence is provided. The apparatus is configured to support coexistence between multiple transceiver circuits configured to communicate radio frequency (RF) signals in a shared RF medium. In examples discussed herein, one transceiver circuit asserts a medium access request via a standard-defined coexistence interface for communicating an RF signal in the shared RF medium. The transceiver circuit may be configured to assert or de-assert the medium access request in response to a variety of trigger events. Depending on whether the medium access request is granted, the transceiver circuit may start communicating the RF signal in the shared RF medium in different modes. As such, it may be possible to reduce medium access delay for the transceiver circuit requesting to access the shared RF medium, while protecting the transceiver circuit currently occupying the shared RF medium from undue interruption and interference.

14 Claims, 5 Drawing Sheets

(51) Int. Cl.
*H04B 1/18* (2006.01)
*H04L 1/1607* (2023.01)
*H04W 72/12* (2023.01)

(52) U.S. Cl.
CPC ....... *H04L 1/1607* (2013.01); *H04W 72/1215* (2013.01)

(56) References Cited

U.S. PATENT DOCUMENTS

| | | | |
|---|---|---|---|
| 9,893,744 B1* | 2/2018 | Patel | H04W 76/16 |
| 2002/0147642 A1 | 10/2002 | Avallone et al. | |
| 2003/0098773 A1 | 5/2003 | Chakravarty et al. | |
| 2003/0226099 A1 | 12/2003 | Tsai et al. | |
| 2007/0161349 A1 | 7/2007 | Grushkevich | |
| 2007/0177542 A1 | 8/2007 | Hirsch | |
| 2007/0183457 A1 | 8/2007 | Leitch | |
| 2008/0279162 A1 | 11/2008 | Desai | |
| 2008/0287158 A1* | 11/2008 | Rayzman | H04W 72/563 455/552.1 |
| 2009/0116437 A1 | 5/2009 | Alexandre et al. | |
| 2010/0067516 A1* | 3/2010 | Sun | H04W 4/80 370/350 |
| 2012/0099496 A1* | 4/2012 | Klein | H04B 1/3805 370/311 |
| 2012/0120857 A1 | 5/2012 | Sudak et al. | |
| 2013/0155931 A1* | 6/2013 | Prajapati | H04B 15/00 370/336 |
| 2013/0344821 A1 | 12/2013 | Armstrong et al. | |
| 2014/0233444 A1* | 8/2014 | Wang | H04W 52/028 370/311 |
| 2016/0105902 A1* | 4/2016 | Hirsch | H04W 72/566 370/329 |
| 2016/0336984 A1 | 11/2016 | Demay et al. | |
| 2018/0131800 A1 | 5/2018 | Shintani et al. | |
| 2018/0242339 A1* | 8/2018 | Choudhary | H04W 4/80 |
| 2018/0242341 A1 | 8/2018 | Dickey et al. | |
| 2018/0291581 A1 | 10/2018 | Duquette | |
| 2019/0045397 A1 | 2/2019 | Mueck et al. | |
| 2019/0075073 A1 | 3/2019 | Erickson et al. | |
| 2019/0128207 A1 | 5/2019 | Blackman et al. | |
| 2019/0207832 A1 | 7/2019 | Dor | |
| 2019/0215100 A1 | 7/2019 | Takahashi et al. | |
| 2019/0253097 A1 | 8/2019 | Dejardin | |
| 2019/0350458 A1 | 11/2019 | Rosero et al. | |
| 2020/0220571 A1 | 7/2020 | Sarode et al. | |
| 2021/0400688 A1* | 12/2021 | Ferrari | H04L 69/14 |

OTHER PUBLICATIONS

Non-Final Office Action for U.S. Appl. No. 16/239,916, dated Aug. 23, 2019, 24 pages.
Final Office Action for U.S. Appl. No. 16/239,916, dated Dec. 13, 2019, 27 pages.
Non-Final Office Action for U.S. Appl. No. 16/239,916, dated Mar. 6, 2020, 22 pages.
Final Office Action for U.S. Appl. No. 16/239,916, dated Jun. 29, 2020, 20 pages.
Advisory Action for U.S. Appl. No. 16/239,916, dated Sep. 15, 2020, 5 pages.
Non-Final Office Action for U.S. Appl. No. 16/239,916, dated Dec. 11, 2020, 21 pages.
Final Office Action for U.S. Appl. No. 16/239,916, dated Apr. 16, 2021, 25 pages.
Advisory Action for U.S. Appl. No. 16/239,916, dated Jun. 29, 2021, 3 pages.
Non-Final Office Action for U.S. Appl. No. 16/239,916, dated Sep. 20, 2021, 19 pages.
Final Office Action for U.S. Appl. No. 16/239,916, dated Jan. 25, 2022, 20 pages.
Advisory Action for U.S. Appl. No. 16/239,916, dated Mar. 24, 2022, 6 pages.

* cited by examiner

APPARATUS SUPPORTING MULTI-RADIO COEXISTENCE

RELATED APPLICATION

This application is a continuation of U.S. patent application Ser. No. 16/239,916, filed on Jan. 4, 2019, the disclosure of which is incorporated herein by reference in its entirety.

FIELD OF THE DISCLOSURE

The technology of the disclosure relates generally to multi-radio coexistence.

BACKGROUND

Wireless communication devices have become increasingly common in current society. The prevalence of these wireless communication devices is driven in part by the many functions that are now enabled on such devices. Increased processing capabilities in such devices means that wireless communication devices have evolved from being pure communication tools into sophisticated multimedia centers that enable enhanced user experiences.

In this regard, a wireless communication device may employ a variety of wireless communication technologies for enabling a variety of concurrent communication scenarios. For example, it may be necessary for the wireless communication device to support such wireless communication technologies as wireless local area network (WLAN) based on the Institute of Electrical and Electronics Engineers (IEEE) 802.11 standard, low-rate wireless system (e.g., ZigBee) based on IEEE 802.15.4 standard, and/or Bluetooth based on the Bluetooth Special Interest Group (SIG) specification.

Notably, the WLAN, the low-rate wireless system, and the Bluetooth technologies are configured to transmit and receive respective radio frequency (RF) signals in the Industrial, Scientific, and Medical (ISM) band. As such, the WLAN, the low-rate wireless system, and the Bluetooth RF signals can potentially interfere with each other when communicated concurrently. Given that a WLAN transmitter typically transmits the WLAN RF signal, which also occupies a larger bandwidth of the ISM band, at a much higher power than a low-rate wireless system transmitter does, a low-rate wireless system receiver may fall victim to the stronger WLAN transmission RF signal due to receiver blocking and/or saturation, particularly when the low-rate wireless system receiver is collocated in close proximity (e.g., in a same form factor) to the WLAN transmitter. In this regard, it may be desired to protect the low-rate wireless system receiver from being interfered by WLAN and/or Bluetooth transmitters when the low-rate wireless system receiver is collocated in proximity to the WLAN/Bluetooth transmitters.

SUMMARY

Aspects disclosed in the detailed description include an apparatus supporting multi-radio coexistence. More specifically, the apparatus is configured to support coexistence between multiple transceiver circuits configured to communicate radio frequency (RF) signals in a shared RF medium, such as an Industrial, Scientific, and Medical (ISM) band. In examples discussed herein, one transceiver circuit asserts a medium access request via a standard-defined coexistence interface for communicating (e.g., transmitting and/or receiving) an RF signal in the shared RF medium regardless of whether the shared RF medium is currently occupied by another transceiver circuit. In a non-limiting example, the transceiver circuit can be configured to assert or de-assert the medium access request in response to a variety of trigger events. Depending on whether the medium access request is granted, the transceiver circuit may start communicating the RF signal in the shared RF medium in different modes. As such, it may be possible to reduce medium access delay for the transceiver circuit requesting to access the shared RF medium, while protecting the transceiver circuit currently occupying the shared RF medium from undue interruption and interference.

In one aspect, a multi-radio apparatus is provided. The multi-radio apparatus includes a first transceiver circuit configured to communicate a first RF signal in a shared RF medium. The multi-radio apparatus also includes a standard-defined coexistence interface coupled to the first transceiver circuit. The multi-radio apparatus also includes a second transceiver circuit coupled to the standard-defined coexistence interface. The second transceiver circuit is configured to assert a medium access request via the standard-defined coexistence interface for communicating a second RF signal in the shared RF medium in response to a first trigger event. The second transceiver circuit is also configured to communicate the second RF signal in a first mode in response to a medium access grant for the medium access request being asserted via the standard-defined coexistence interface. The second transceiver circuit is also configured to communicate the second RF signal in a second mode in response to the medium access grant for the medium access request not being asserted. The second transceiver circuit is also configured to de-assert the medium access request in response to a second trigger event.

In another aspect, a method for supporting coexistence between a first transceiver circuit configured to communicate a first RF signal and a second transceiver circuit configured to communicate a second RF signal in a shared RF medium is provided. The method includes asserting a medium access request for communicating the second RF signal in the shared RF medium in response to a first trigger event. The method also includes communicating the second RF signal in a first mode in response to a medium access grant for the medium access request being asserted. The method also includes communicating the second RF signal in a second mode in response to the medium access grant for the medium access request not being asserted. The method also includes de-asserting the medium access request in response to a second trigger event.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include an apparatus supporting multi-radio coexistence. More specifically, the apparatus is configured to support coexistence between multiple transceiver circuits configured to communicate radio frequency (RF) signals in a shared RF medium, such as an Industrial, Scientific, and Medical (ISM) band. In examples discussed herein, one transceiver circuit asserts a medium access request via a standard-defined coexistence interface for communicating (e.g., transmitting and/or receiving) an RF signal in the shared RF medium regardless of whether the shared RF medium is currently occupied by another transceiver circuit. In a non-limiting example, the transceiver circuit can be configured to assert or de-assert the medium access request in response to a variety of trigger events. Depending on whether the medium access request is granted, the transceiver circuit may start communicating the RF signal in the shared RF medium in different modes. As such, it may be possible to reduce medium access delay for the transceiver circuit requesting to access the shared RF medium, while protecting the transceiver circuit currently occupying the shared RF medium from undue interruption and interference to help improve link quality.

Figure 1A:
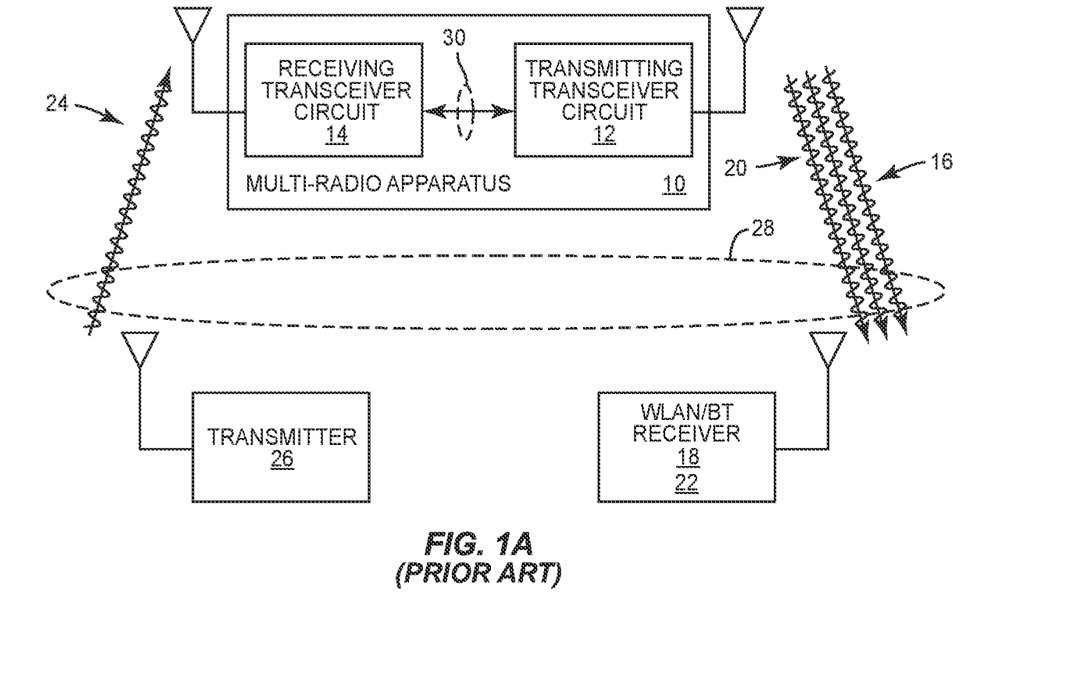
FIG. 1A is a schematic diagram of an exemplary existing multi-radio apparatus in which a transmitting transceiver circuit can cause undue radio frequency (RF) interference to a receiving transceiver circuit due to insufficient RF separation between the transmitting transceiver circuit and the receiving transceiver circuit.
Figure 1B:
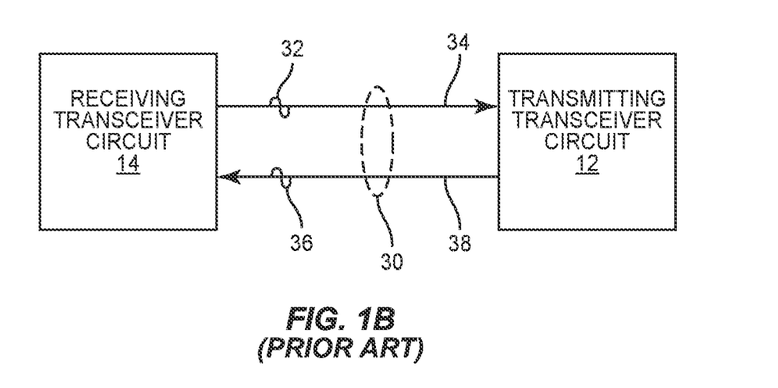
FIG. 1B is a schematic diagram providing an exemplary illustration of a standard-defined coexistence interface for mitigating RF interference caused by the transmitting transceiver circuit to the receiving transceiver circuit of FIG. 1A.

Before discussing the apparatus of the present disclosure, a brief overview of a standard-defined coexistence interface between a pair of collocated transceiver circuits is first provided with reference to FIGS. 1A and 1B. The discussion of specific exemplary aspects of the apparatus supporting multi-radio coexistence according to the present disclosure starts below with reference to FIG. 2.

FIG. 1A is a schematic diagram of an exemplary existing multi-radio apparatus 10 in which a transmitting transceiver circuit 12 can cause undue RF interference to a receiving transceiver circuit 14 due to insufficient RF separation between the transmitting transceiver circuit 12 and the receiving transceiver circuit 14. The transmitting transceiver circuit 12 may be a wireless local area network (WLAN)

transceiver circuit configured to transmit a WLAN RF signal 16 to a WLAN receiver 18 in accordance with medium access control (MAC) layer and physical (PHY) layer specifications as defined by the Institute of Electrical and Electronics Engineers (IEEE) 802.11 standard. The transmitting transceiver circuit 12 may also be a Bluetooth (BT) transceiver circuit configured to transmit a BT RF signal 20 to a BT receiver 22 in accordance to MAC layer and PHY layer specifications as defined by the Bluetooth Special Interest Group (SIG) standard. The receiving transceiver circuit 14 may be a low-rate wireless system (e.g., ZigBee) transceiver circuit configured to receive a low-rate RF signal 24 from a low-rate wireless system transmitter 26 in accordance to MAC layer and PHY layer specifications as defined by the IEEE 802.15.4 standard.

The transmitting transceiver circuit 12 is configured to transmit the WLAN RF signal 16 and/or the BT RF signal 20, and the receiving transceiver circuit 14 is configured to receive the low-rate RF signal 24 in a shared RF medium 28. The shared RF medium 28 may correspond to the Industrial, Scientific, and Medical (ISM) band occupying a 2.4-2.5 GHz RF spectrum.

The transmitting transceiver circuit 12 and the receiving transceiver circuit 14 are collocated in the existing multi-radio apparatus 10. Hereinafter, a pair of transceiver circuits is referred to as being collocated when the transceiver circuits are provided in a same form factor and/or separated by 10-40 dB of RF separation. Notably, the transmitting transceiver circuit 12 may transmit at a significantly higher power than the low-rate wireless system transmitter 26 does. As a result, the WLAN RF signal 16 and/or the BT RF signal 20 may block and saturate the receiving transceiver circuit 14. Consequently, the receiving transceiver circuit 14 may be impaired to receive the low-rate RF signal 24.

To help mitigate RF interference between the transmitting transceiver circuit 12 and the receiving transceiver circuit 14 collocated in the existing multi-radio apparatus 10, the IEEE 802.15.2 standard has defined a standard-defined coexistence interface 30, which is also known as a two-wire coexistence interface. Hereinafter, the standard-defined coexistence interface 30 as defined by the IEEE 802.15.2 is referred to as a standard-defined coexistence interface.

FIG. 1B is a schematic diagram providing an exemplary illustration of the standard-defined coexistence interface 30 for mitigating RF interference caused by the transmitting transceiver circuit 12 to the receiving transceiver circuit 14 of FIG. 1A. In a non-limiting example, the transmitting transceiver circuit 12 is currently transmitting the WLAN RF signal 16 (not shown) and/or the BT RF signal 20 (not shown) in the shared RF medium 28 (not shown), while the receiving transceiver circuit 14 is prepared to receive the low-rate RF signal 24 (not shown) via the shared RF medium 28. In this regard, the receiving transceiver circuit 14 provides a medium access request 32 to the transmitting transceiver circuit 12 via a first wire 34 of the standard-defined coexistence interface 30. In a non-limiting example, the receiving transceiver circuit 14 may initiate the medium access request 32 by asserting the first wire 34 to a logical HIGH. Upon receiving the medium access request 32, the transmitting transceiver circuit 12 may respond in a number of ways.

In one embodiment, the transmitting transceiver circuit 12 can suspend transmission of the WLAN RF signal 16 and/or the BT RF signal 20 immediately. Subsequently, the transmitting transceiver circuit 12 provides a medium access grant 36 to the receiving transceiver circuit 14 via a second wire 38 in the standard-defined coexistence interface 30. In a non-limiting example, the transmitting transceiver circuit 12 may initiate the medium access grant 36 by asserting the second wire 38 to a logical HIGH. Accordingly, the receiving transceiver circuit 14 can start receiving the low-rate RF signal 24 without interference from the WLAN RF signal 16 and/or the BT RF signal 20. Upon successful completion of receiving the low-rate RF signal 24, the receiving transceiver circuit 14 may cancel the medium access request 32 by de-asserting the first wire 34 to a logical LOW. In response, the transmitting transceiver circuit 12 cancels the medium access grant 36 by de-asserting the second wire 38 to a logical LOW and resumes transmission of the WLAN RF signal 16 and/or the BT RF signal 20. By immediately suspending transmission of the transmitting transceiver circuit 12, it may be possible to reduce medium access delay of the receiving transceiver circuit 14. However, the reduction in medium access delay may come at an expense of potential disruption to the WLAN RF signal 16 and/or the BT RF signal 20.

In another embodiment, the transmitting transceiver circuit 12 can suspend transmission of the WLAN RF signal 16 and/or the BT RF signal 20 after completing current transmission. Subsequently, the transmitting transceiver circuit 12 provides the medium access grant 36 to the receiving transceiver circuit 14 via the second wire 38 in the standard-defined coexistence interface 30. In a non-limiting example, the transmitting transceiver circuit 12 may initiate the medium access grant 36 by asserting the second wire 38 to a logical HIGH. Accordingly, the receiving transceiver circuit 14 can start receiving the low-rate RF signal 24 without interference from the WLAN RF signal 16 and/or the BT RF signal 20. Upon successful completion of receiving the low-rate RF signal 24, the receiving transceiver circuit 14 may cancel the medium access request 32 by de-asserting the first wire 34 to a logical LOW. In response, the transmitting transceiver circuit 12 cancels the medium access grant 36 by de-asserting the second wire 38 to a logical LOW and resumes transmission of the WLAN RF signal 16 and/or the BT RF signal 20. In this case, the receiving transceiver circuit 14 may suffer an increased medium access delay, thus causing a potential disruption to the low-rate RF signal 24.

In another embodiment, the transmitting transceiver circuit 12 may chose to ignore the medium access request 32. Accordingly, the transmitting transceiver circuit 12 maintains the second wire 38 as the logical LOW. In this regard, the receiving transceiver circuit 14 may be denied a chance to receive the low-rate RF signal 24 in an interference-protected manner.

As discussed above, the standard-defined coexistence interface 30 may help mitigate RF interference caused by the transmitting transceiver circuit 12 to the receiving transceiver circuit 14 in the existing multi-radio apparatus 10. However, depending on different ways of handling the medium access request 32, the transmitting transceiver circuit 12 and/or the receiving transceiver circuit 14 may be subject to undue interruption in transmitting/receiving respective RF signals. Hence, it may be desired to enhance the existing multi-radio apparatus 10 to reduce medium access delay of the receiving transceiver circuit 14, while protecting the transmitting transceiver circuit 12 from undue interruption and interference.

Figure 2:
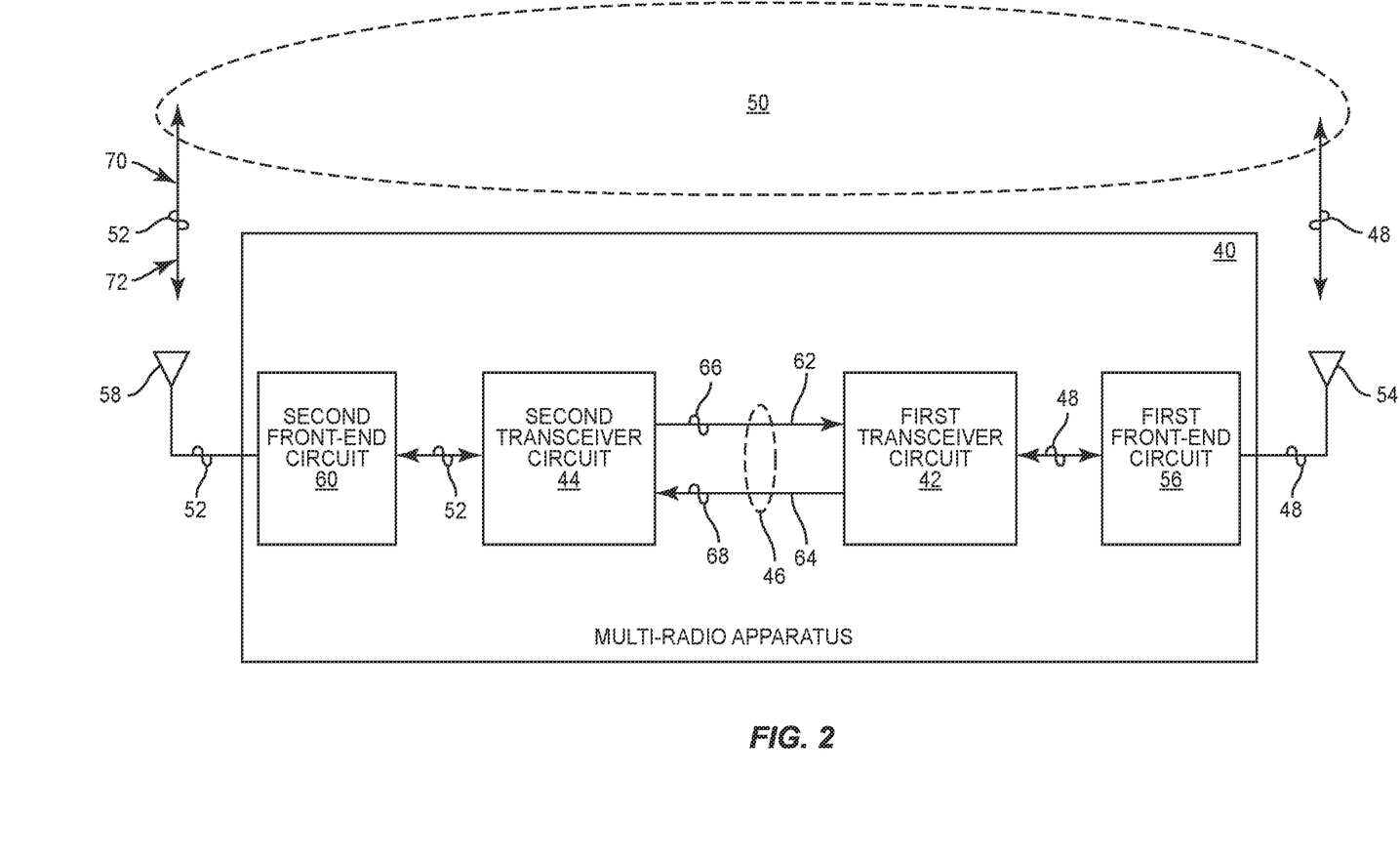
FIG. 2 is a schematic diagram of an exemplary multi-radio apparatus configured according to an embodiment of the present disclosure to support an enhanced multi-radio coexistence scheme between a first transceiver circuit and a second transceiver circuit based on a standard-defined coexistence interface.

In this regard, FIG. 2 is a schematic diagram of an exemplary multi-radio apparatus 40 configured according to an embodiment of the present disclosure to support an enhanced multi-radio coexistence scheme between a first transceiver circuit 42 and a second transceiver circuit 44 based on a standard-defined coexistence interface 46. In examples discussed herein, the first transceiver circuit 42 can be a WLAN/BT transceiver circuit configured to communicate a WLAN/BT RF signal 48 (also referred to as "first RF signal") in a shared RF medium 50. The second transceiver circuit 44 may be a low-rate wireless system (e.g., ZigBee) transceiver circuit configured to communicate a low-rate RF signal 52 (also referred to as "second RF signal") in the shared RF medium 50. The shared RF medium 50 may be an ISM band located in the 2.4-2.5 GHz RF spectrum.

The first transceiver circuit 42 may be coupled to a first antenna(s) 54 via a first front-end circuit 56, which may include a power amplifier (PA) (not shown) for amplifying the first RF signal 48 prior to being radiated by the first antenna(s) 54 and a low-noise amplifier (LNA) (not shown) for amplifying the first RF signal 48 after being absorbed by the first antenna(s) 54. The second transceiver circuit 44 may be coupled to a second antenna(s) 58 via a second front-end circuit 60, which may include a PA (not shown) for amplifying the second RF signal 52 prior to being radiated by the second antenna(s) 58 and an LNA (not shown) for amplifying the second RF signal 52 after being absorbed by the second antenna(s) 58.

The standard-defined coexistence interface 46 is identical to the standard-defined coexistence interface 30 in FIGS. 1A and 1B. Accordingly, the standard-defined coexistence interface 46 includes a first wire 62 and a second wire 64 that are identical to the first wire 34 and the second wire 38 in the standard-defined coexistence interface 30, respectively. In this regard, the multi-radio apparatus 40 is configured to support the enhanced coexistence scheme between the first transceiver circuit 42 and the second transceiver circuit 44 without requiring any change to the standard-defined coexistence interface 46.

The first transceiver circuit 42 is identical to the transmitting transceiver circuit 12 in FIG. 1A. In this regard, the multi-radio apparatus 40 is able to support the enhanced coexistence scheme without requiring intrusive change in the first transceiver circuit 42. As such, it may be possible to employ any standard-compliant WLAN/BT transceiver circuit in a plug-and-play manner, thus helping to reduce complexity and costs associated with implementation of the enhanced coexistence scheme.

The second transceiver circuit 44 is functionally equivalent to the receiving transceiver circuit 14 in FIG. 1A. However, the second transceiver circuit 44 is modified from the receiving transceiver circuit 14 to incorporate additional functionalities for enabling the enhanced coexistence scheme of the present disclosure. More specifically, the second transceiver circuit 44 may be configured to enable the enhanced coexistence scheme based on a process, as discussed next in FIG. 3.

Figure 3:
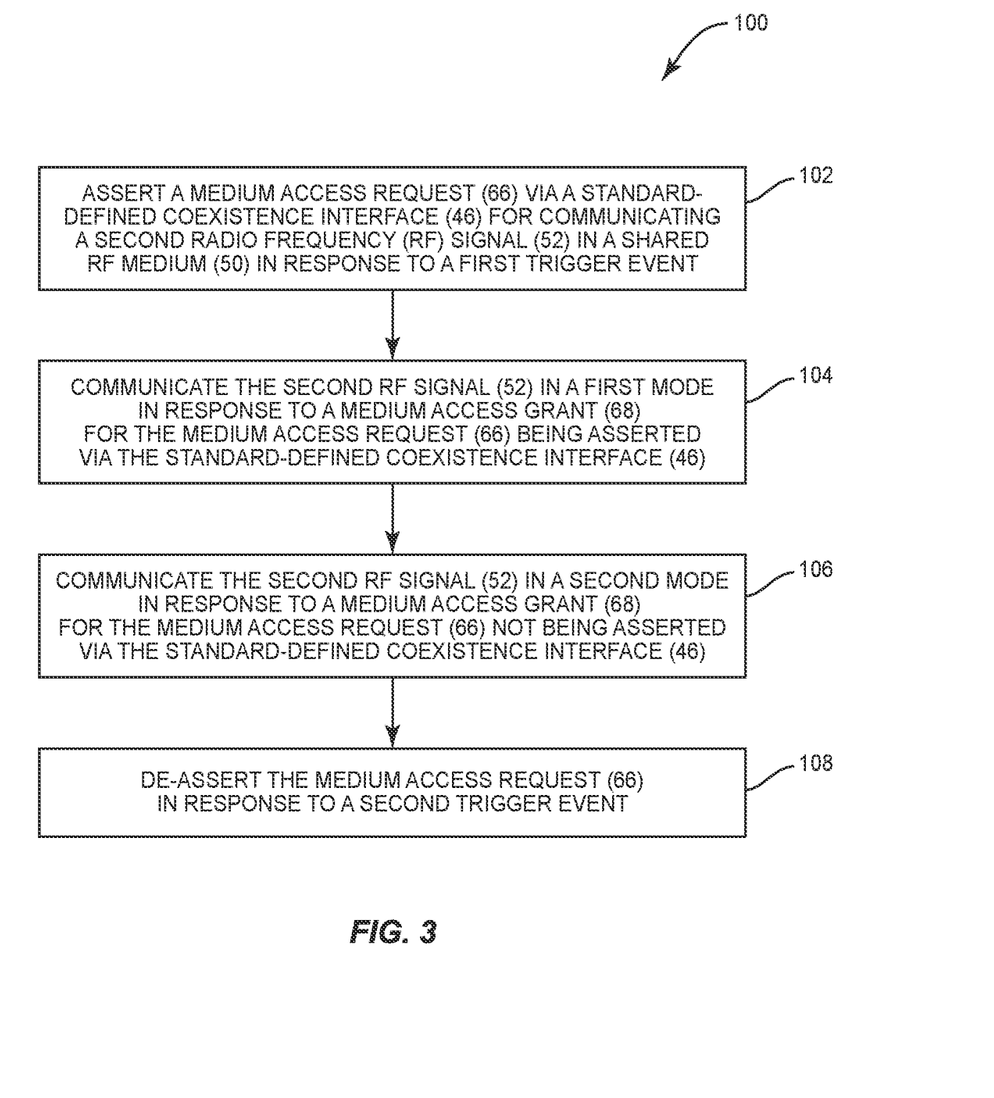
FIG. 3 is a flowchart of an exemplary process that can be employed by the second transceiver circuit of FIG. 2 to enable the enhanced coexistence scheme in the multi-radio apparatus.

FIG. 3 is a flowchart of an exemplary process 100 that can be employed by the second transceiver circuit 44 of FIG. 2 to enable the enhanced coexistence scheme in the multi-radio apparatus 40. The process 100 includes the additional functionalities being incorporated into the second transceiver circuit 44 of FIG. 2 for enabling the enhanced coexistence scheme.

According to the process 100, the second transceiver circuit 44 asserts a medium access request 66 via the standard-defined coexistence interface 46 for communicating (transmitting or receiving) the second RF signal 52 in the shared RF medium 50 in response to a first trigger event (block 102). In a non-limiting example, the second transceiver circuit 44 can assert the medium access request 66 by toggling the first wire 62 in the standard-defined coexistence interface 46 from a logical LOW to a logical HIGH.

The first transceiver circuit 42, which may be currently occupying the shared RF medium 50, may become aware of the medium access request 66 by detecting the first wire 62 being togged to the logical HIGH. In response, the first transceiver circuit 42 may grant the medium access request 66, either immediately or after a short delay. In a non-limiting example, the short delay can be caused by hardware implementation and/or software function calls. In addition, the short delay may also be caused as a result of the first transceiver circuit 42 attempting to complete an ongoing transmission/reception prior to yielding the shared RF medium 50 to the second transceiver circuit 44. Accordingly, the first transceiver circuit 42 may assert a medium access grant 68, for example, by toggling the second wire 64 in the standard-defined coexistence interface 46 from a logical LOW to a logical HIGH. The second transceiver circuit 44 may determine that the medium access request 66 is granted when the second wire 64 is toggled to the logical HIGH.

In this regard, the second transceiver circuit 44 is configured to communicate the second RF signal 52 in a first mode in response to the medium access grant 68 for the medium access request 66 being asserted via the standard-defined coexistence interface 46 (block 104). In contrast, the second transceiver circuit 44 is configured to communicate the second RF signal 52 in a second mode in response to the medium access grant 68 for the medium access request 66 not being asserted via the standard-defined coexistence interface 46 (block 106).

The second transceiver circuit 44 is further configured to de-assert the medium access request 66 in response to a second trigger event (block 108). The second transceiver circuit 44 may de-assert the medium access request 66 by toggling the first wire 62 in the standard-defined coexistence interface 46 from the logical HIGH to the logical LOW. Accordingly, the first transceiver circuit 42 may then toggle the second wire 64 from the logical HIGH to the logical LOW.

With reference back to FIG. 2, the first trigger event that causes the second transceiver circuit 44 to assert the medium access request 66 can include a variety of predefined events. In one example, the second transceiver circuit 44 is preparing to receive the second RF signal 52 via the shared RF medium 50. In this regard, the first trigger event can correspond to a successful reception of a preamble/start-frame delimiter (SFD) of an incoming packet(s) 70 in the second RF signal 52. In another example, the second transceiver circuit 44 is preparing to transmit the second RF signal 52 via the shared RF medium 50. In this regard, the first trigger event can correspond to a successful detection of a standardized trigger event, such as an IEEE 802.15.4 MAC layer command.

If the first transceiver circuit 42 asserts the medium access grant 68 immediately upon detecting the medium access request 66, the second transceiver circuit 44 is configured to communicate (transmit or receive) the second RF signal 52 in the first mode. In the first mode, the second transceiver circuit 44 may activate the PA in the second front-end circuit 60 to amplify the second RF signal 52 prior to being radiated by the second antenna(s) 58. In this regard, the first mode may be seen as a "full-power" mode.

In contrast, if the first transceiver circuit 42 does not assert the medium access grant 68 immediately or within a defined delay (e.g., 200 μs) upon detecting the medium access request 66, the second transceiver circuit 44 is configured to communicate (transmit or receive) the second RF signal 52 in the second mode. In the second mode, the second transceiver circuit 44 may deactivate the PA in the second front-end circuit 60 such that the second RF signal 52 is not amplified prior to being radiated by the second antenna(s) 58. In this regard, the second mode may be seen as a "reduced-power" mode. Moreover, the second transceiver circuit 44 may cause the second RF signal 52 to be attenuated prior to being radiated by the second antenna(s) 58. In a non-limiting example, the second RF signal 52 can be attenuated to a defined power level that is below a receiver saturation threshold of the first transceiver circuit 42 such that the second RF signal 52 does not interfere with the first transceiver circuit 42 when the second RF signal 52 is transmitted in a different channel from the first transceiver circuit 42.

Despite being transmitted at a reduced power level, an outgoing packet(s) 72 in the second RF signal 52 may still be received by a nearby low-rate wireless system receiver (not shown). Thus, by transmitting the second RF signal 52 in the second mode, it may be possible to reduce a medium access delay for the second transceiver circuit 44 even when the first transceiver circuit 42 does not yield the shared RF medium 50 in a timely fashion. Notably, the second transceiver circuit 44 may not know whether the outgoing packet(s) 72 has been received correctly in absence of an acknowledgement (ACK) from the low-rate wireless system receiver. In this regard, the second transceiver circuit 44 may be configured to retransmit the outgoing packet(s) 72 when the first transceiver circuit 42 asserts the medium access grant 68.

In the unlikely event that the first transceiver circuit 42 denies the medium access request 66, the second transceiver circuit 44 may be configured to cause the first transceiver circuit 42 to be decoupled from the first front-end circuit 56 and the first antenna(s) 54. The second transceiver circuit 44 may set a delay time-out timer immediately upon asserting the medium access request 66. Accordingly, the second transceiver circuit 44 may cause the first transceiver circuit 42 to be decoupled from the first front-end circuit 56 and the first antenna(s) 54 upon expiration of the delay time-out timer. In this regard, the second transceiver circuit 44 can forcefully take over the shared RF medium at an expense of the first transceiver circuit 42. Notably, this scenario should not happen if the first transceiver circuit 42 is configured to operate in compliance with the standard-defined coexistence interface 46. The second transceiver circuit 44 may reset the delay time-out timer in response to the second wire 64 being asserted to the logical HIGH or upon successful reception of an ACK.

Given that the second RF signal 52 is often communicated with a relatively longer duty-cycle, the second transceiver circuit 44 is configured to occupy the shared RF medium 50 longer than needed. In this regard, the second transceiver circuit 44 is configured to de-assert the medium access request 66 in response to the second trigger event.

In one non-limiting example, the second transceiver circuit 44 can initiate a predefined time-out timer immediately when the medium access grant 68 is asserted. The predefined time-out timer may be longer than a temporal duration for transmitting/receiving an 802.15.4 packet and/or the duration for completing an MAC layer retransmission(s). In this regard, the second trigger event can correspond to an expiration of the predefined time-out timer. By de-asserting the medium access request 66 based on the predefined time-out timer, it may be possible to prevent the second transceiver circuit 44 from holding the shared RF medium 50 for an excessive length of time, thus helping data throughput on the shared RF medium 50.

In another non-limiting example, the second transceiver circuit 44 acquires the shared RF medium 50 for receiving the incoming packet(s) 70 in the second RF signal 52. In this regard, the second trigger event may correspond to a successful transmission of an ACK by the second transceiver circuit 44 in response to successful reception of the incoming packet(s) 70.

In another non-limiting example, the second transceiver circuit 44 acquires the shared RF medium 50 for transmitting the outgoing packet(s) 72 in the second RF signal 52. In this regard, the second trigger event may correspond to a successful reception of an ACK by the second transceiver circuit 44 in response to the transmission of the outgoing packet(s) 72.

As discussed earlier, the second transceiver circuit 44 may assert the medium access request 66 in response to detection of the preamble of the incoming packet(s) 70. In this regard, the second transceiver circuit 44 may be further configured to examine the destination address of the incoming packet(s) 70 to help determine whether the incoming packet(s) 70 is destined to the second transceiver circuit 44. In case the incoming packet(s) 70 is not destined to the second transceiver circuit 44, the incoming packet(s) 70 may be treated as an invalid incoming packet(s). Accordingly, the second trigger event can correspond to detection of the invalid incoming packet(s).

Some specific non-limiting examples of the enhanced coexistence scheme are now discussed in reference to FIGS. 4-6 below. Common elements between FIGS. 2 and 4-6 are shown therein with common element numbers and will not be re-described herein.

Figure 4:
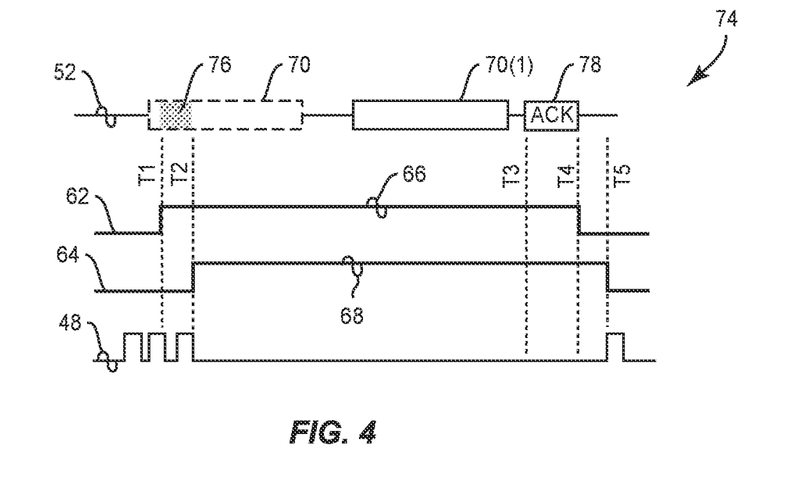
FIG. 4 is a time sequence diagram providing an exemplary time sequence for acquiring a shared RF medium by the second transceiver circuit of FIG. 2 to receive an RF signal.

FIG. 4 is a time sequence diagram providing an exemplary time sequence 74 for acquiring the shared RF medium 50 by the second transceiver circuit 44 of FIG. 2 to receive the second RF signal 52. At time T1, the second transceiver circuit 44 detects a preamble/SFD 76 of the incoming packet(s) 70 (first trigger event) and asserts the medium access request 66 on the first wire 62. In the meantime, the first transceiver circuit 42 is communicating the first RF signal 48 on the shared RF medium 50 (not shown). At time T2, the first transceiver circuit 42 asserts the medium access grant 68 on the second wire 64 and suspends communication of the first RF signal 48. The second transceiver circuit 44, one the other hand, may have missed at least part of the incoming packet(s) 70 and does not acknowledge reception of the incoming packet(s) 70. As a result, a retransmitted incoming packet(s) 70(1) may be sent and subsequently received by the second transceiver circuit 44. In response, the second transceiver circuit 44 transmits an ACK 78 (second trigger event) at time T3 and de-asserts the medium access request 66 at time T4. In response, at time T5, the first transceiver circuit 42 de-asserts the medium access grant 68 and resumes communication of the first RF signal 48 thereafter.

Figure 5:
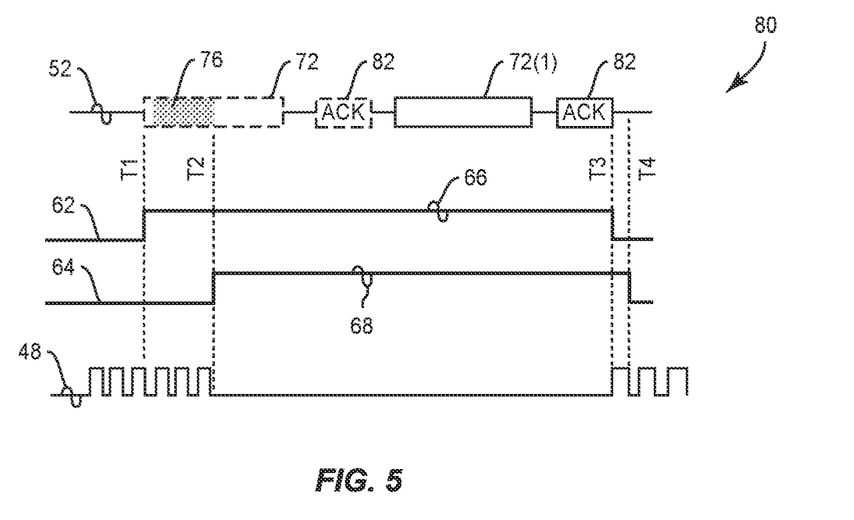
FIG. 5 is a time sequence diagram providing an exemplary time sequence for acquiring a shared RF medium by the second transceiver circuit of FIG. 2 to transmit an RF signal.

FIG. 5 is a time sequence diagram providing an exemplary time sequence 80 for acquiring the shared RF medium 50 by the second transceiver circuit 44 of FIG. 2 to transmit the second RF signal 52. At time T1, the second transceiver circuit 44 asserts the medium access request 66 on the first wire 62 and starts transmitting the outgoing packet(s) 72 in the second mode. In this regard, the outgoing packet(s) 72 is transmitted at a reduced power level and may not be correctly received by an intended receiver. As a result, the second transceiver circuit 44 may not receive an ACK 82 as expected. At time T2, the first transceiver circuit 42 asserts the medium access grant 68 on the second wire 64. In case the second transceiver circuit 44 did not receive the ACK 82 as expected, the second transceiver circuit 44 retransmits the outgoing packet(s) 72(1) in the first mode. At time T3, the second transceiver circuit 44 receives the ACK 82 (second trigger event) for the retransmitted outgoing packet(s) 72(1). Accordingly, the second transceiver circuit 44 de-asserts the medium access request 66. In response, at time T4, the first transceiver circuit 42 de-asserts the medium access grant 68 and resumes communication of the first RF signal 48 thereafter.

Figure 6:
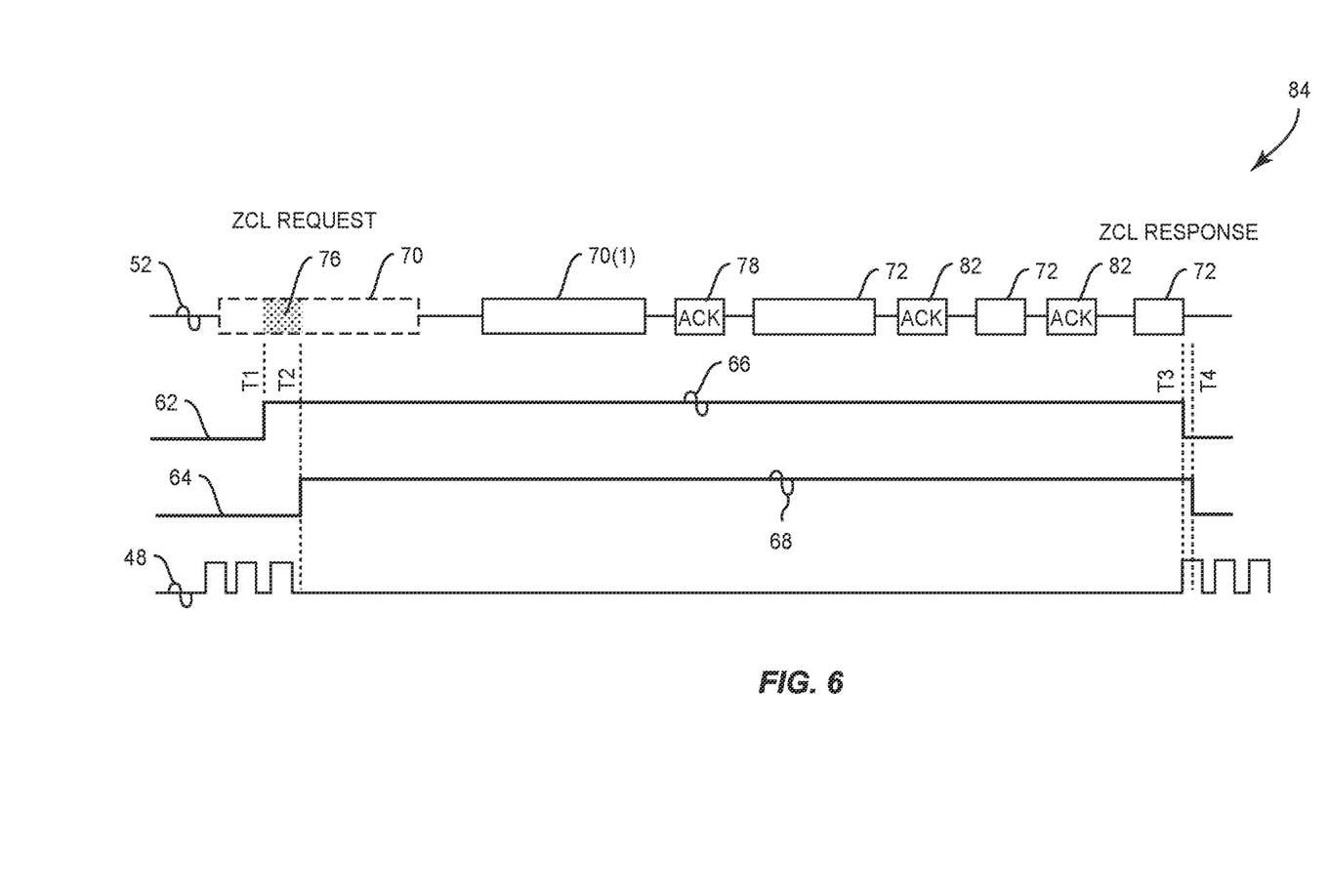
FIG. 6 is a time sequence diagram providing an exemplary time sequence for acquiring a shared RF medium by the second transceiver circuit of FIG. 2 to transmit and receive an RF signal.

FIG. 6 is a time sequence diagram providing an exemplary time sequence 84 for acquiring the shared RF medium 50 by the second transceiver circuit 44 of FIG. 2 to transmit and receive the second RF signal 52. At time T1, the second transceiver circuit 44 receives a preamble/SFD 76 of an IEEE 802.15.4 ZigBee cluster library (ZCL) request command (first trigger event) in the incoming packet(s) 70. Accordingly, the second transceiver circuit 44 asserts the medium access request 66 on the first wire 62. In the meantime, the first transceiver circuit 42 is still communicating with the first RF signal 48 on the shared RF medium 50 (not shown). As a result, the second transceiver circuit 44 may not receive the incoming packet(s) 70 correctly and thus may not be able to acknowledge the incoming packet(s) 70. At time T2, the first transceiver circuit 42 asserts the medium access grant 68 on the second wire 64. Accordingly, the second transceiver circuit 44 may receive the retransmitted incoming packet(s) 70(1) and transmit the ACK 78. Subsequently, the second transceiver circuit 44 may transmit a number of outgoing packets 72 and receive a number of corresponding ACKs 82. The second transceiver circuit 44 may conclude a packet exchange by transmitting an IEEE 802.15.4 ZCL response packet as the final outgoing packet(s) 72 (second trigger event) and subsequently de-assert the medium access request 66 at time T3. In response, at time T4, the first transceiver circuit 42 de-asserts the medium access grant 68 and resumes communication of the first RF signal 48 thereafter.

Those skilled in the art will recognize improvements and modifications to the embodiments of the present disclosure. All such improvements and modifications are considered within the scope of the concepts disclosed herein and the claims that follow.

What is claimed is:

1. A multi-radio apparatus comprising:
   a first transceiver circuit configured to communicate a first radio frequency (RF) signal in a shared RF medium;
   a standard-defined coexistence interface coupled to the first transceiver circuit; and
   a second transceiver circuit coupled to the standard-defined coexistence interface and configured to:
   assert a medium access request via the standard-defined coexistence interface for communicating a second RF signal in the shared RF medium in response to detecting a preamble of an incoming packet in the second RF signal;
   set a predetermined time-out timer immediately when the medium access request is granted, wherein the predefined time-out timer is longer than a temporal duration required for completing one or more of:
   receiving the incoming packet in the second RF signal; and
   receiving a medium access control (MAC) layer retransmission of the incoming packet; and
   de-assert the medium access request via the standard-defined coexistence interface in response to an expiration of the predefined time-out timer.

2. The multi-radio apparatus of claim 1, wherein the second transceiver circuit is further configured to de-assert the medium access request via the standard-defined coexistence interface after transmitting an acknowledgement for the incoming packet.

3. The multi-radio apparatus of claim 2, wherein the second transceiver circuit is further configured to transmit the acknowledgement for the incoming packet in response to not receiving an initial transmission of the incoming packet but receiving a retransmission of the incoming packet.

4. The multi-radio apparatus of claim 1, wherein the second transceiver circuit is further configured to:
   examine a destination address of the incoming packet to determine whether the incoming packet is destined to the second transceiver circuit; and
   de-assert the medium access request in response to determining that the incoming packet is not destined to the second transceiver circuit.

5. The multi-radio apparatus of claim 1, wherein the first transceiver circuit is further configured to:
   assert a medium access grant to the second transceiver circuit in response to the medium access request being asserted; and
   de-assert the medium access grant to the second transceiver circuit in response to the medium access request being de-asserted.

6. A method for supporting coexistence between a first transceiver circuit configured to communicate a first radio frequency (RF) signal and a second transceiver circuit configured to communicate a second RF signal in a shared RF medium comprising:
   asserting a medium access request for receiving the second RF signal in the shared RF medium in response to detecting a preamble of an incoming packet in the RF signal;
   setting a predetermined time-out timer immediately when the medium access request is granted, wherein the predefined time-out timer is longer than a temporal duration required for completing one or more of:
   receiving the incoming packet in the second RF signal; and
   receiving a medium access control (MAC) layer retransmission of the incoming packet; and
   de-asserting the medium access request in response to an expiration of the predefined time-out timer.

7. The method of claim 6, further comprising de-asserting the medium access request after transmitting an acknowledgement for the incoming packet.

8. The method of claim 7, further comprising transmitting the acknowledgement for the incoming packet in response to not receiving an initial transmission of the incoming packet but receiving a retransmission of the incoming packet.

9. The method of claim 6, further comprising:
   examining a destination address of the incoming packet to determine whether the incoming packet is destined to the second transceiver circuit; and
   de-asserting the medium access request in response to determining that the incoming packet is not destined to the second transceiver circuit.

10. The method of claim 6, further comprising:
    asserting a medium access grant to the second transceiver circuit in response to the medium access request being asserted; and de-asserting the medium access grant to the second transceiver circuit in response to the medium access request being de-asserted.

11. A transceiver circuit comprising processing circuitry configured to cause the transceiver circuit to:

assert a medium access request via a standard-defined coexistence interface for receiving a radio frequency (RF) signal in a shared RF medium in response to detecting a preamble of an incoming packet in the RF signal;

set a predetermined time-out timer immediately when the medium access request is granted, wherein the predefined time-out timer is longer than a temporal duration required for completing one or more of:

receiving the incoming packet in the RF signal; and receiving a medium access control (MAC) layer retransmission of the incoming packet; and de-assert the medium access request via the standard-defined coexistence interface in response to an expiration of the predefined time-out timer.

12. The transceiver circuit of claim 11, wherein the processing circuitry is further configured to cause the transceiver circuit to de-assert the medium access request via the standard-defined coexistence interface after transmitting an acknowledgement for the incoming packet.

13. The transceiver circuit of claim 12, wherein the processing circuitry is further configured to cause the transceiver circuit to transmit the acknowledgement for the incoming packet in response to not receiving an initial transmission of the incoming packet but receiving a retransmission of the incoming packet.

14. The transceiver circuit of claim 11, wherein the processing circuitry is further configured to cause the transceiver circuit to:

examine a destination address of the incoming packet to determine whether the incoming packet is destined to the transceiver circuit; and de-assert the medium access request in response to determining that the incoming packet is not destined to the transceiver circuit.

\* \* \* \* \*